US008254839B2

(12) United States Patent
Hsien

(10) Patent No.: US 8,254,839 B2
(45) Date of Patent: Aug. 28, 2012

(54) SIGNAL TRANSMITTING DEVICE FOR DRUMS

(76) Inventor: Chao-Ying Hsien, Taichung (TW)

( * ) Notice: Subject to any disclaimer, the term of this patent is extended or adjusted under 35 U.S.C. 154(b) by 660 days.

(21) Appl. No.: 12/512,954

(22) Filed: Jul. 30, 2009

(65) Prior Publication Data

US 2010/0105326 A1 Apr. 29, 2010

Related U.S. Application Data

(63) Continuation-in-part of application No. 12/256,479, filed on Oct. 23, 2008, now abandoned.

(51) Int. Cl.
*H04B 7/00* (2006.01)

(52) U.S. Cl. ..................... 455/41.2; 455/41.3; 455/11.1; 455/517; 455/518; 455/519; 455/59; 455/88; 455/103; 455/149; 455/272; 455/267; 455/268; 84/107

(58) Field of Classification Search ........................ None
See application file for complete search history.

(56) References Cited

U.S. PATENT DOCUMENTS

| | | | | |
|---|---|---|---|---|
| 3,551,580 | A * | 12/1970 | Glenn et al. | 84/723 |
| 5,056,400 | A * | 10/1991 | Wachi et al. | 84/600 |
| 6,982,376 | B2 * | 1/2006 | Wise | 84/600 |
| 7,256,342 | B2 * | 8/2007 | Hagiwara et al. | 84/726 |
| 7,259,317 | B2 * | 8/2007 | Hsien | 84/723 |

* cited by examiner

*Primary Examiner* — Fayyaz Alam
*Assistant Examiner* — Mohammed Rachedine

(57) ABSTRACT

A signal transmitting device of the present invention includes a plurality of drums and a sound module. Each drum has a pickup and a wireless signal transceiver, and the sound module includes several wireless signal receivers, each of which corresponds to one of the drums. While the drum is beaten upon, the pickup sends a signal to the wireless signal transceiver, and the signal is then transmitted to the corresponding wireless signal receiver wirelessly. Thereby, the complex wiring process can be significantly simplified or even totally resolved.

9 Claims, 6 Drawing Sheets

SIGNAL TRANSMITTING DEVICE FOR DRUMS

This is a CIP of application Ser. No. 12/256,479, filed Oct. 23, 2008 now abandoned. The present invention relates to a wireless signal transmitting device between drums and a sound module.

BACKGROUND OF THE INVENTION

Field of the Invention

Description of the Prior Art

A conventional pickup of a drum transmits a signal to a sound module by wires. However, this transmitting method leads to time-consuming and complex wiring, especially for jazz performance with multiple drums and other percussion instruments. Besides, this method also arises another problem that it is almost impossible to carry about the drum during the military music performance, since the wires will greatly influence the parade of the players.

SUMMARY OF THE INVENTION

The main object of the present invention is to provide a wireless signal transmitting device for drums.

To achieve the above object, a signal transmitting device of the present invention includes a plurality of drums and a sound module. Each drum has a pickup and a wireless signal transceiver, and the sound module includes several wireless signal receivers, each of which corresponds to one of the drums. While the drum is beaten upon, the pickup sends a signal to the wireless signal transceiver, and the signal is then transmitted to the corresponding wireless signal receiver wirelessly.

Thereby, the complex wiring process can be significantly simplified or even totally resolved.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
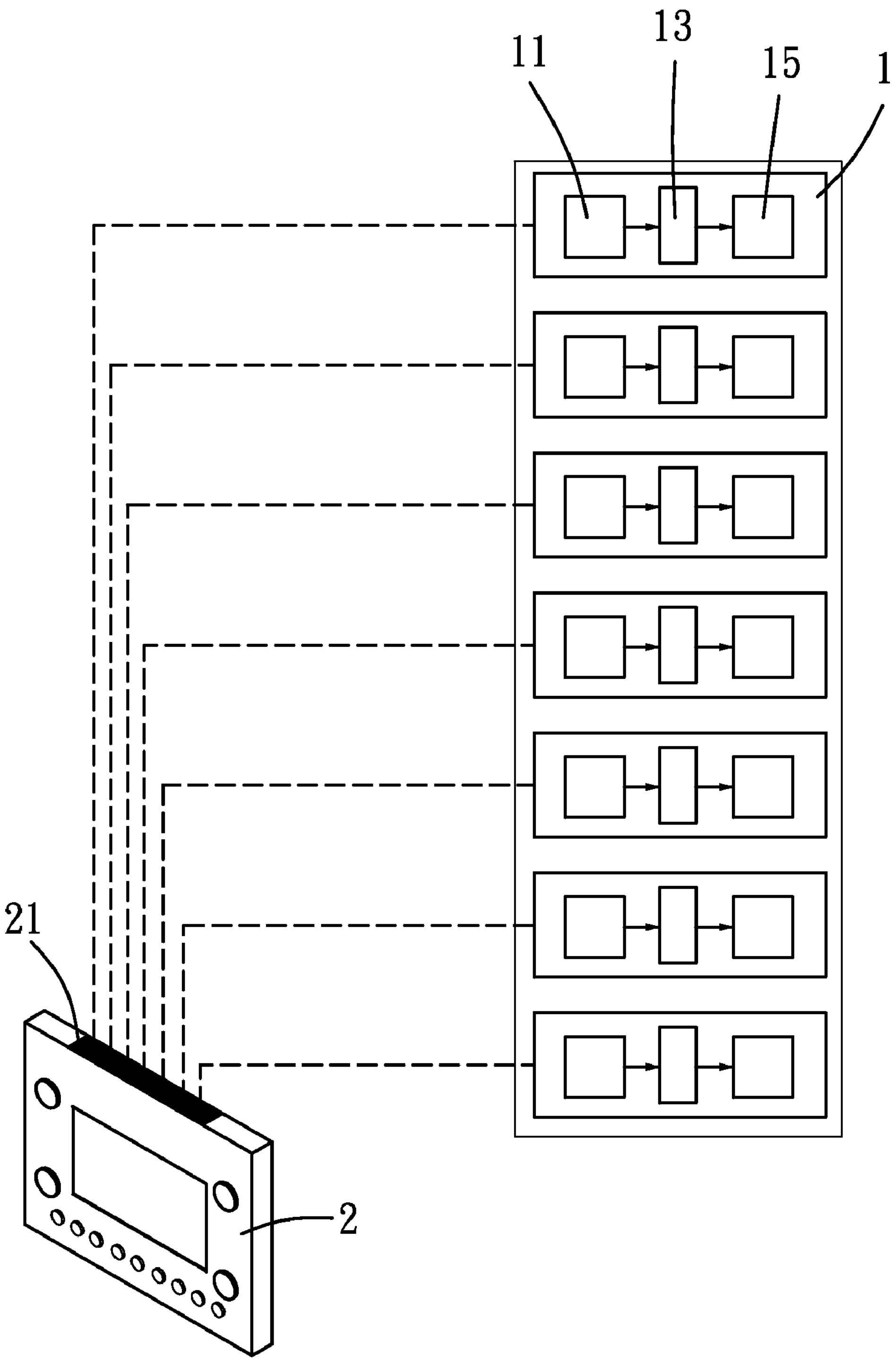
FIG. 1 is a schematic view of a first embodiment of the present invention.
Figure 2:
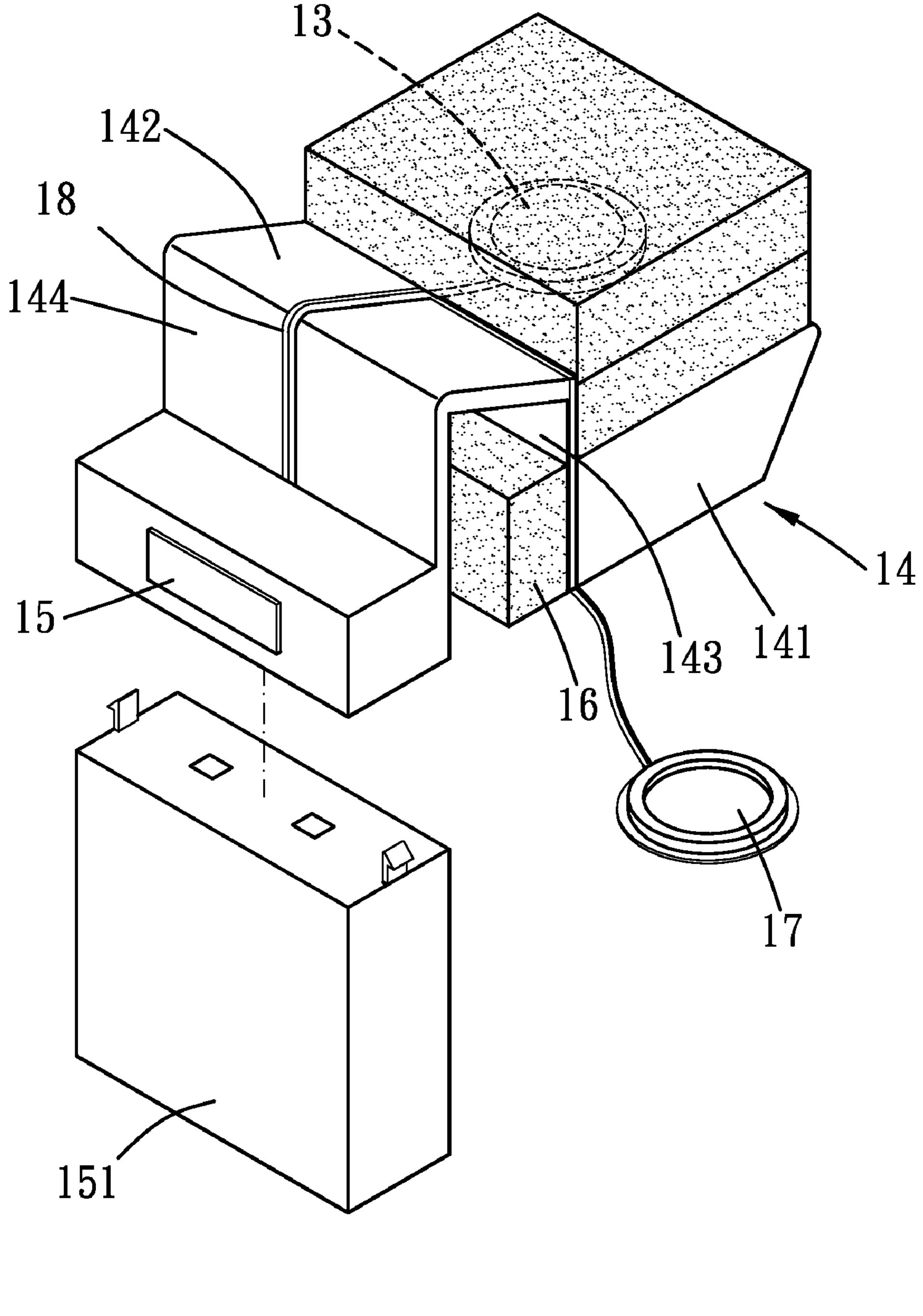
FIG. 2 is a pictorial drawing showing a pickup, a supporting seat and a wireless signal transceiver of the present invention.
Figure 3:
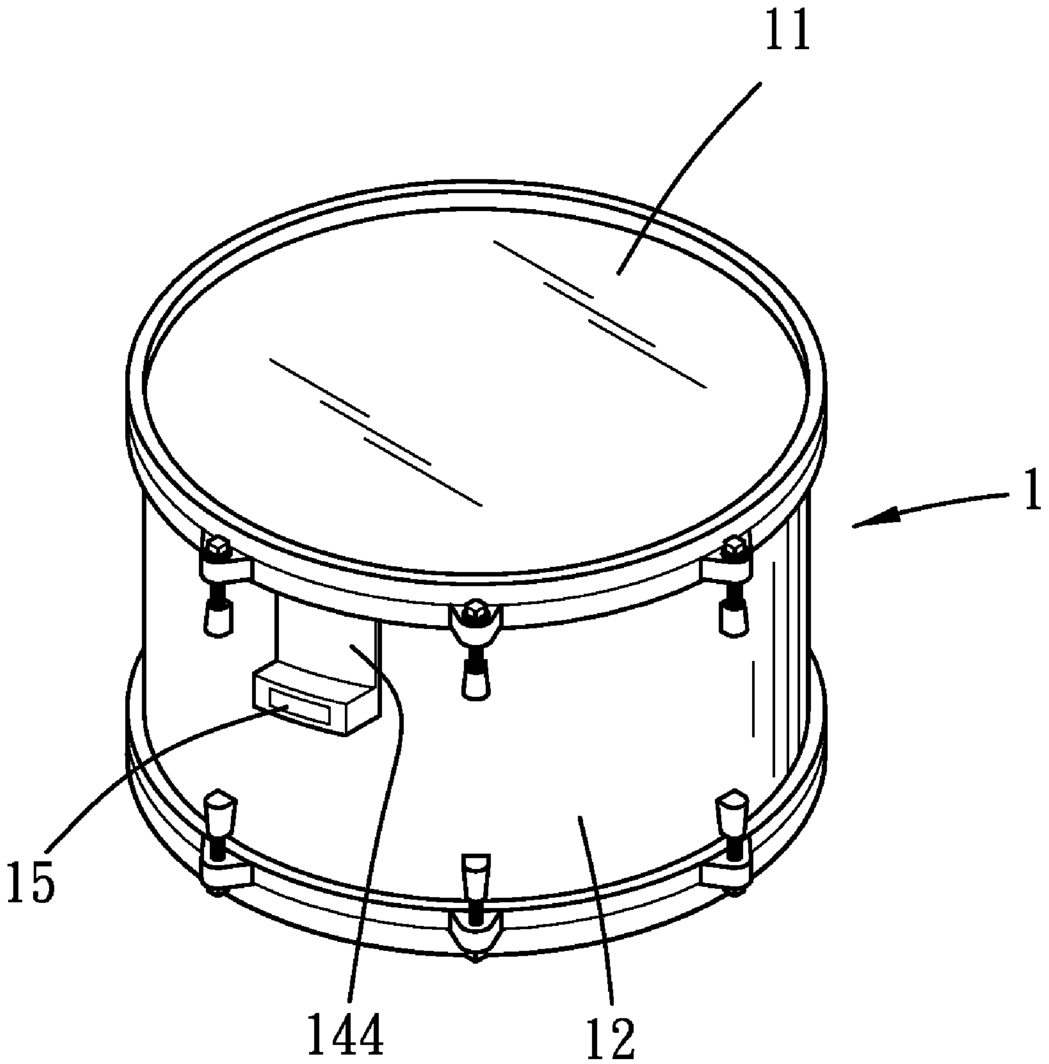
FIG. 3 is a pictorial drawing showing a drum of the present invention.
Figure 4:
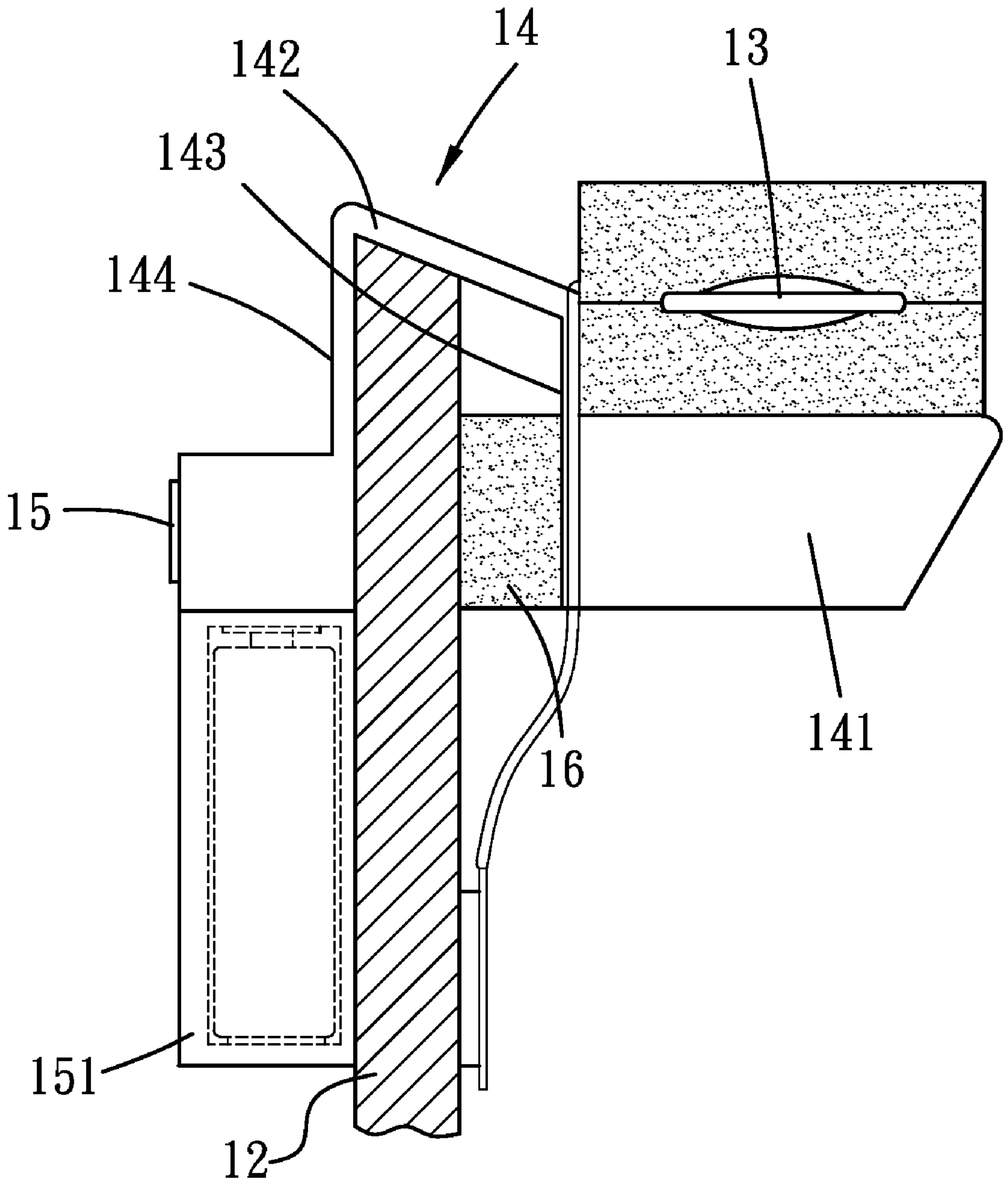
FIG. 4 is a profile showing a pickup and a supporting seat disposed on a drum rim of the present invention.
Figure 5:
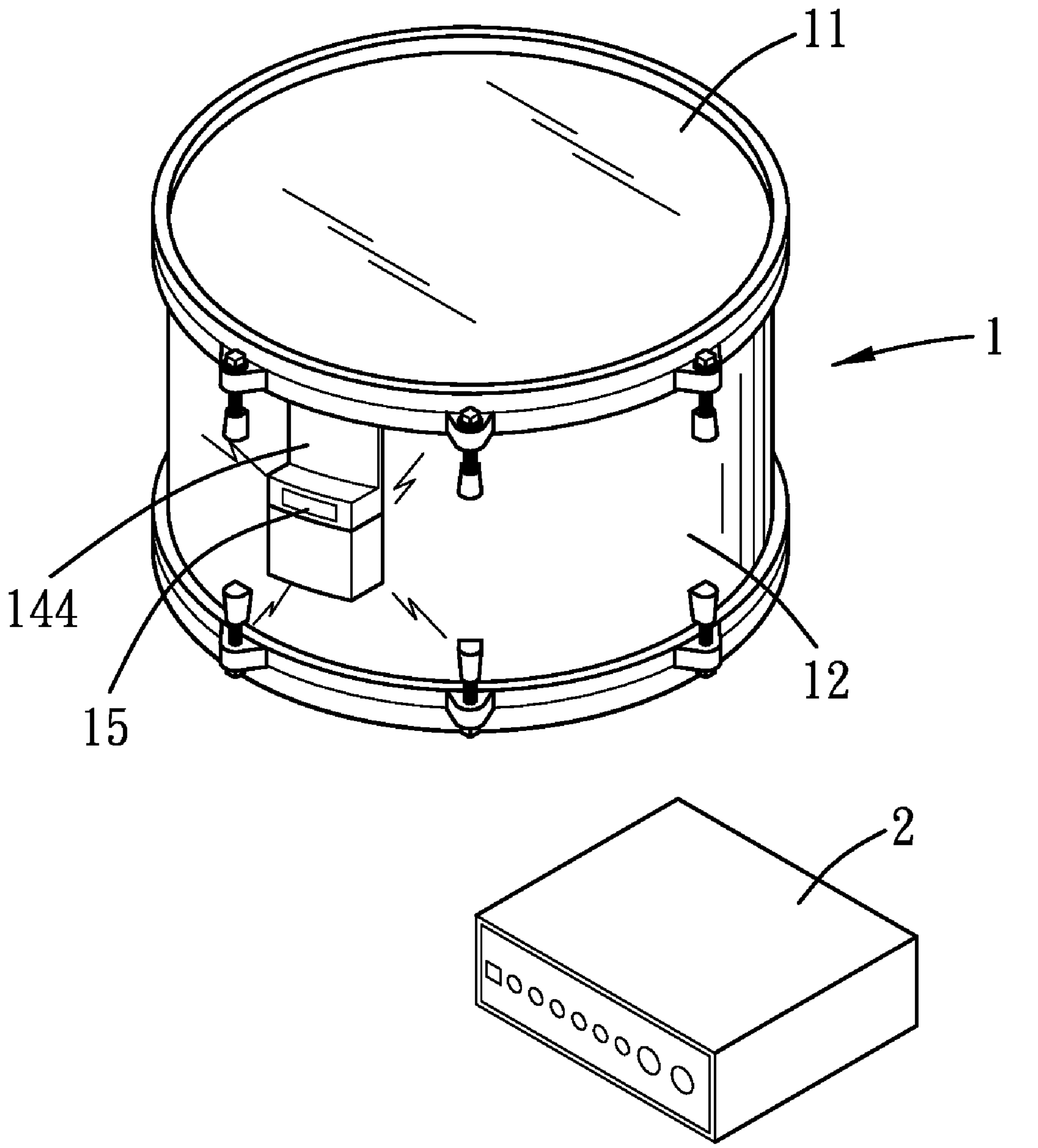
FIG. 5 is a pictorial drawing showing a drum and a sound module of the present invention.

Please refer to FIG. 1 to 5 for a first embodiment of the present invention. A signal transmitting device includes a plurality of drums 1 and a sound module 2. Each drum 1 has a drum tympan 11 to be beaten upon and a drum rim 12. The drum rim 12 is cylindrical and has at least one opening on one side thereof, and the drum tympan 11 envelops the opening. The drum tympan 11 is made of materials that make sounds upon beaten, or it can be made of a muffle material that makes little sound while beaten, which is common seen in electronic drums. In addition, the sound module 2 can process beating signals and then transfers the signals into audio signals, which is to be broadcasted by a speaker. The sound module 2 has at least one wireless signal receiver 21.

Each drum 1 has a pickup 13, a supporting seat 14 and a wireless signal transceiver 15. The supporting seat 14 includes a supporting portion 141 and a positioning portion 142. The pickup 13 is disposed on the supporting portion 141, and the position portion 142 is disposed on the drum rim 12 for positioning purpose. More specifically, the pickup 13 is enclosed by two shock isolators made of foam or other soft material from above and below. The pickup 13 abuts against a bottom surface of the drum tympan 11 where close to a periphery of the drum tympan 11, i.e. the pickup 13 is not disposed at the center of the tympan II so as not to influence the vibration of the tympan 11. As such, the beats of the tympan 11 can be accurately picked up by the pickup 13. In other words, the pickup 13 detects the beat of the tympan 11 and then sends a signal corresponding to the beat to the wireless signal transceiver 15. Furthermore, a battery 151 can electrically connect to the wireless signal transceiver 15 to supply power thereto. A groove 18 is disposed on the positioning portion 142 where between the pickup 13 and the wireless signal transceiver 15 to receive a wire connecting the pickup 13 and the wireless signal transceiver 15. In addition, a sub-pickup 17 is disposed on an inner surface of the drum rim 12. The sub-pickup 17 also sends a signal, which corresponds to the vibration of the drum rim 12, to the wireless signal transceiver 15. The vibration of the drum rim 12 may be produced when the upper periphery of the drum rim 12 (rather than the drum tympan) is beaten upon.

Moreover, the positioning portion 142 is n-shaped, in which it has a first section 143 and a second section 144. The first section 143 connects to the supporting portion 141, and the second section 144 abuts against an outer surface of the drum rim 12 in parallel. A pad 16 is further sandwiched between the first section 143 and an inner surface of the drum rim 12 so as to tightly engage the supporting seat 14 with the drum rim 12.

Once the wireless signal transceiver 15 receives the signal from the pickup 13, the transceiver 15 transmits the signal to the wireless signal receiver 21 in a wireless manner, and the wireless signal receiver 21 further transmits the signal to the sound module 2 thereafter. The above-mentioned wireless manner includes radio frequency, radio wave, blue tooth or infrared. In addition, the connections between the pickup 13 and the transceiver 15, and between the receiver 21 and the sound module 2 are conducted by wires. Furthermore, the sound module 2 can be a computer, and the wireless signal receiver 21 transmits the signal to the sound module 2 through an interface of IEEE 1394 sequence interface, USB interface or blue tooth interface.

Figure 6:
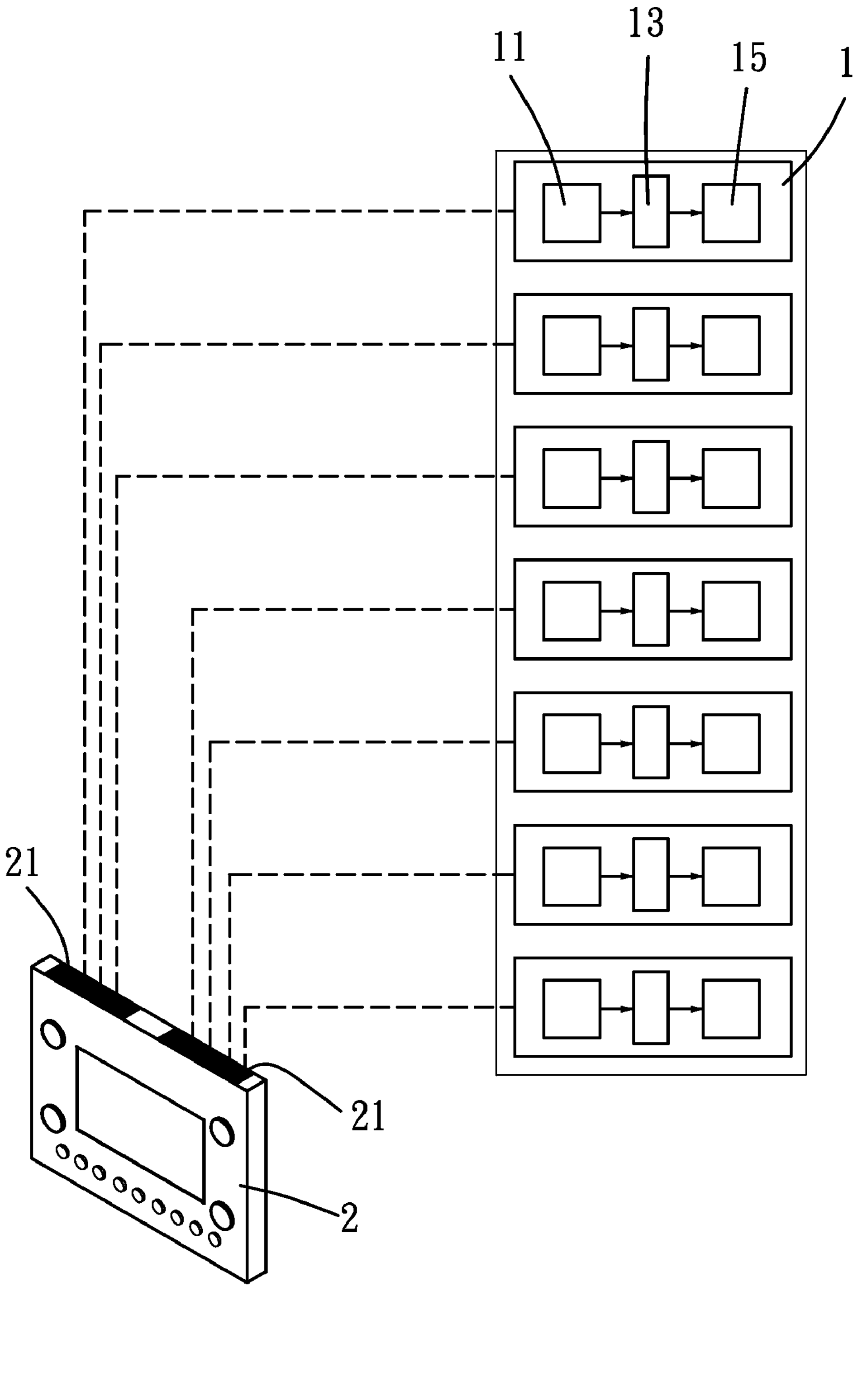
FIG. 6 is a schematic view of a second embodiment of the present invention.

Please refer to FIG. 6. In the second embodiment of the present invention, the sound module 2 includes two wireless signal receivers 21 to increase the transmitting efficiency. That is to say, each receiver 21 corresponds to only part of the transceivers 15. Preferably, each receiver 21 corresponds to just one of the transceiver 15, thus preventing audio delay or distortion resulting from signal interference.

The signal transmitting device of the present invention prevents the complex wiring between the sound module and the drums, and it will no longer influence the parade or formation change of a military music performance. Furthermore, the pickup of the present invention is disposed close to the periphery of the drum tympan rather than the center thereof, such that the pickup just interferes the vibration of the tympan slightly yet still directly contacts the tympan to ensure the beating signal undistorted. In addition, the first and second sections of the supporting seat tightly clamp the drum rim without any threaded means, and the pad sandwiched between the first section and the drum rim further prevents the pickup from picking up undesired noise signals.

What is claimed is:

1. A signal transmitting device for drums, comprising:

a plurality of drums, each drum having a drum tympan and a drum rim, the drum tympan enveloping an opening of the drum rim, each drum further having a pickup, a supporting seat and a wireless signal transceiver, the supporting seat having a supporting portion and a positioning portion, the positioning portion being fixed to the drum rim, the pickup being disposed on the supporting portion, and the pickup abutting against a bottom surface of the drum tympan where close to a periphery of the drum tympan, the pickup sending a signal, which corresponds to a beat upon the drum tympan, to the wireless signal transceiver;

a sound module, having at least one wireless signal receiver which corresponds to at least one of the drums, the wireless signal receiver receiving the signal transmitted from the wireless signal transceiver of its corresponding drum;

wherein the pickup is enclosed by shock isolators made of foam or other soft material;

wherein the positioning portion is n-shaped, the position portion has a first section and a second section, the first section connects to the supporting portion, and the second section abuts against an outer surface of the drum rim in parallel.

2. The signal transmitting device of claim 1, wherein a pad is sandwiched between the first section and an inner surface of the drum rim.

3. The signal transmitting device of claim 1, wherein the wireless signal transceiver electrically connects to a battery.

4. The signal transmitting device of claim 1, wherein the wireless signal transceiver transmits the signal to the wireless signal receiver in a manner of radio frequency, radio wave, blue tooth or infrared.

5. The signal transmitting device of claim 1, wherein the sound module is a computer.

6. The signal transmitting device of claim 5, wherein the wireless signal receiver transmits the signal to the sound module through an interface of IEEE 1394 sequence interface, USB interface or blue tooth interface.

7. The signal transmitting device of claim 1, wherein the pickup is clamped by two shock isolators from above and below.

8. The signal transmitting device of claim 1, further comprising a sub-pickup disposed on an inner surface of the drum rim, the sub-pickup sending a signal, which corresponds to the vibration of the drum rim, to the wireless signal transceiver.

9. The signal transmitting device of claim 1, wherein a groove is disposed on the positioning portion where between the pickup and the wireless signal transceiver to receive a wire connecting the pickup and the wireless signal transceiver.

* * * * *